March 19, 1929. F. F. HAYES 1,706,291
PUTTY MIXING AND CONDITIONING MACHINE
Filed Feb. 14, 1925 2 Sheets-Sheet 1
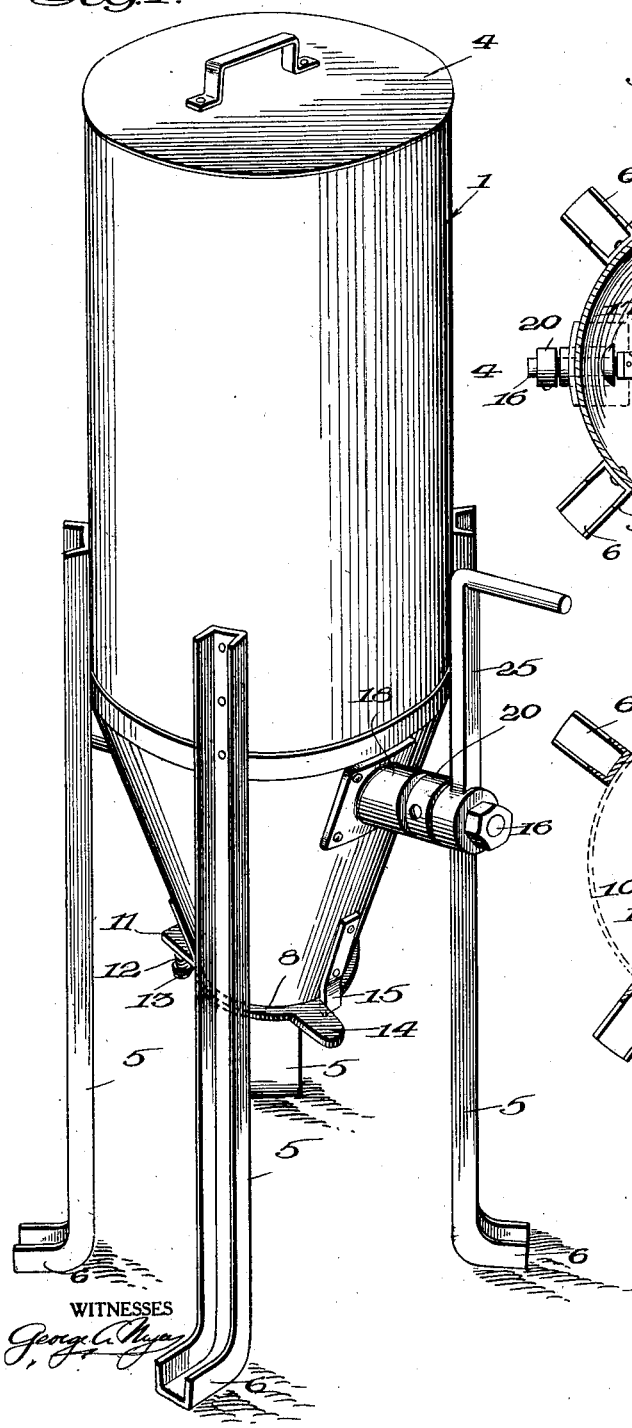
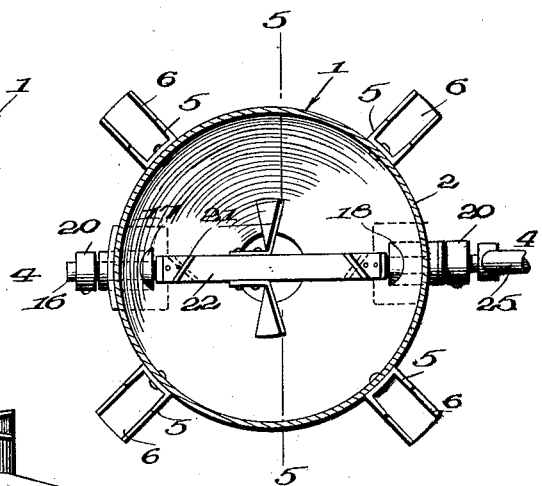
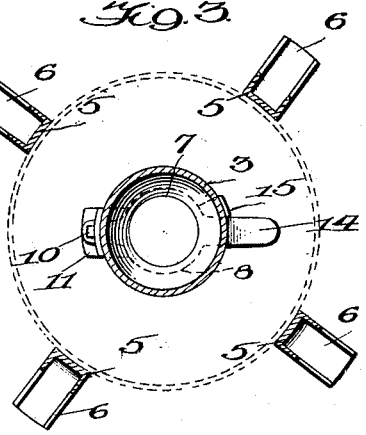
INVENTOR
FRANK F. HAYES,
BY
ATTORNEYS March 19, 1929. F. F. HAYES 1,706,291
PUTTY MIXING AND CONDITIONING MACHINE
Filed Feb. 14, 1925 2 Sheets-Sheet 2
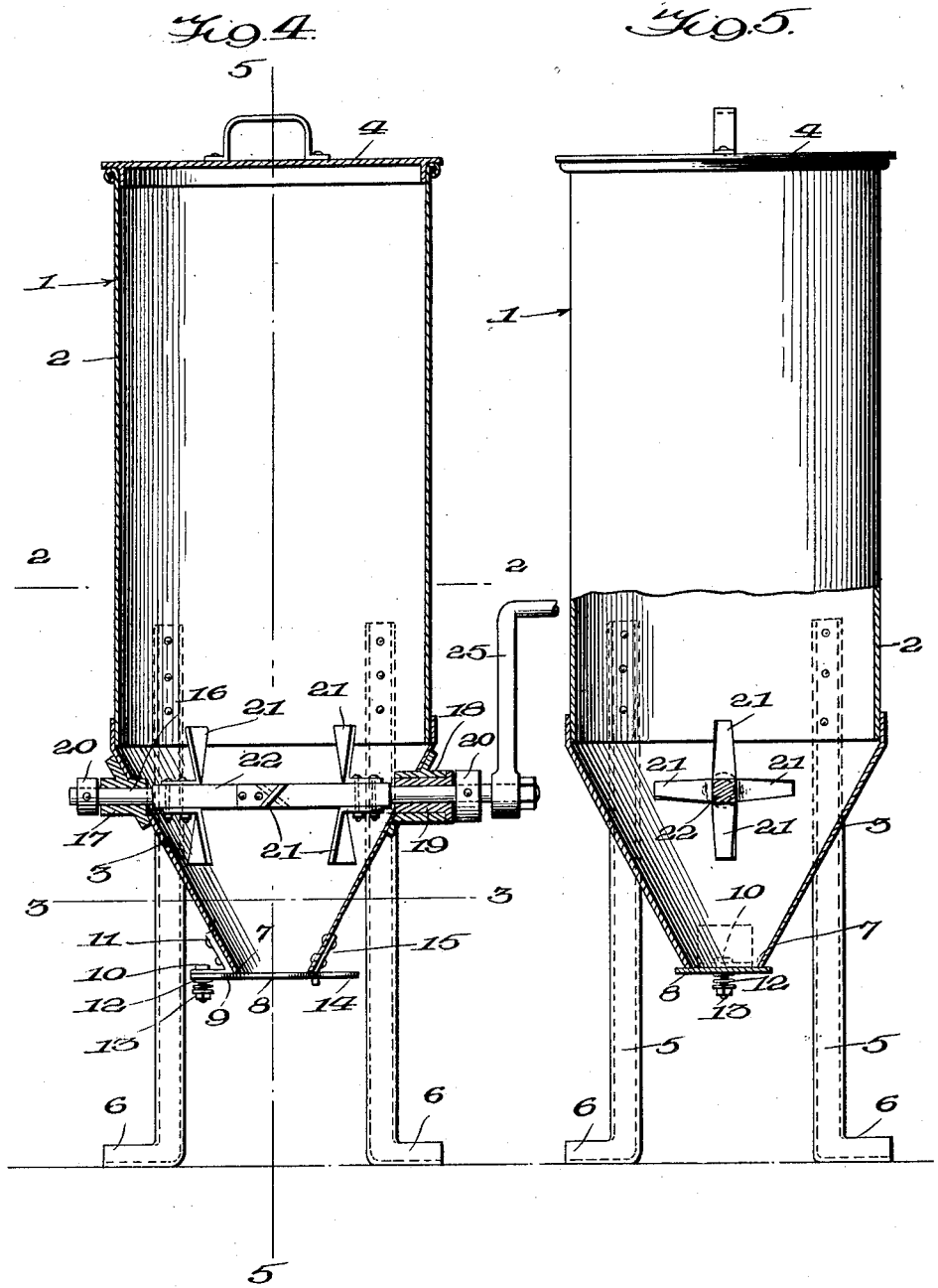
WITNESSES
INVENTOR
FRANK F. HAYES,
BY
ATTORNEYS Patented Mar. 19, 1929.

1,706,291

UNITED STATES PATENT OFFICE.

FRANK FAIRCLOUGH HAYES, OF BUTTE, MONTANA.

PUTTY MIXING AND CONDITIONING MACHINE.

Application filed February 14, 1925. Serial No. 9,278.

This invention relates to an improvement in machines for mixing and dispensing putty or other substances or commodities.

One of the principal objects of the invention resides in the provision of a machine of this character which when used to mix and dispense putty thoroughly kneads and mixes the putty so as to properly condition the same prior to the dispensing of the putty from the machine.

A further object of the invention resides in the provision of a machine having the foregoing advantages and capacities and which is adapted to effect a rapid and positive dispensing or discharge of the putty from the machine.

A still further object is the provision of a machine of this character which has novel and effective means for cutting off and preventing the discharge of putty from the machine.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view of one embodiment of the invention,

Figure 2 is a view in horizontal section on the line 2—2 of Figure 4,

Figure 3 is a similar view on the line 3—3 of Figure 4,

Figure 4 is a view in central vertical section taken on the line 4—4 of Figure 2, and Figure 5 is a view partly in elevation and partly in section, the section being taken approximately on the line 5—5 of Figure 2.

Referring to the drawings, the numeral 1 designates generally the container in which the putty is placed. The container includes a cylindrical body portion 2 having at its lower end a frusto-conical spout 3 and provided at its upper end with a removable cover 4. The container is supported on legs 5 which are secured to the body portion 2 and which have their lower ends turned outwardly to provide feet 6.

The frusto-conical discharge spout 3 is formed at its lower end with a discharge opening 7. An accommodation cut off and closure plate 8 is provided for the discharge opening 7 and has an apertured portion 9 coacting with a pivot bolt 10 carried by a bracket 11 riveted to the discharge spout. A coil spring 12 self circles the bolt 10 and engages the portion 9 of the plate 8 and also engages a nut 13 threaded on the bolt 10. With this arrangement the cut-off and discharge plate 8 is always held up against the lower end of the discharge spout 3. A handle 14 is provided to facilitate manipulation of the plate 8 and the handle also co-acts with a stop 15 riveted to the discharge head. When the handle 14 is engaged with the stop 15 the plate 8 completely covers and closes the discharge opening 8.

A shaft 16 is journaled for rotary movement in bearings 17 and 18 carried by the discharge spout 3. The bearing 18 is provided with a bearing bushing 19 which directly engages the shaft 16. Collars 20 pinned to the shaft 16 prevent endwise movement of the same. The shaft 16 extends transversely of the discharge spout end of the container above the discharge opening and carries rows of mixing and feeding vanes or blades 21, the blades 21 being carried by sleeves 22 pinned or otherwise suitably secured to the shaft 16.

Means is provided for turning the shaft 16 and may consist of a crank handle 25 fixed thereto.

When the crank handle 25 is turned the shaft 16 is rotated and consequently the mixing blades or vanes 21 are also rotated. Rotation of the mixing vanes or blades 21 results in the thorough kneading and mixing of the putty so that the same is properly conditioned for use. If the plate 8 has been swung to such position as to leave the discharge opening 7 uncovered, rotation of the blades or vanes 21 effects a forced and rapid feed of the putty toward the center from opposite directions and through the discharge opening 7. When a sufficient quantity has been dispensed the shaft 16 is no longer turned and the plate 8 is swung back to closed position. During its swinging movement the plate 8 cuts off any putty that may be hanging down through the discharge opening. It is to be understood the device is adapted for use with any other substance or commodity which should be mixed or kneaded before and while being dispensed.

I claim:

1. A machine for mixing and conditioning putty, comprising a vertical cylindrical container having a frusto-conical lower portion, said lower portion having a dispensing orifice at its lower end and having diametrically opposite lateral openings in its upper end, removable bearings fitted in said lateral openings said bearings provided with annular inclined flanges held in close contact with the outer walls of said frusto-conical lower portion, a horizontal shaft extending through said bearings, means for holding said shaft in the bearings against longitudinal movement, mixing and feeding vanes mounted on said shaft, including a central vane and end vanes, the end vanes having reverse pitch, whereby to mix and feed the conditioned putty to the center vane for dispensing, and means for rotating the shaft.

2. A machine for mixing and conditioning putty comprising a vertically disposed container having a frusto-conical lower end, said end having a discharge opening at its apex portion, a closure controlling said discharge opening, a horizontal shaft extending through the upper part of said conical end, mixing and feeding vanes carried by said shaft in tandem relation, one vane being at the center and the other vanes at each side thereof and adjacent the ends of the shaft, said end vanes being of reverse pitch, whereby the material will be mixed and forced to the center from opposite directions, and additionally mixed by the center vane and forced from the discharge opening, and means for causing rotation of said shaft.

FRANK FAIRCLOUGH HAYES.